United States Patent
Oron et al.

(10) Patent No.: US 7,944,549 B2
(45) Date of Patent: May 17, 2011

(54) OPTICAL SCREEN, SYSTEMS AND METHODS FOR PRODUCING AND OPERATING SAME

(75) Inventors: Ram Oron, Nes Ziona (IL); Doron Nevo, Ra'anana (IL); Moshe Oron, Rehovot (IL); Sharon Goldstein, Ra'anana (IL)

(73) Assignee: Israel Aerospace Industries Ltd. (IL)

( * ) Notice: Subject to any disclaimer, the term of this patent is extended or adjusted under 35 U.S.C. 154(b) by 81 days.

(21) Appl. No.: 11/911,043

(22) PCT Filed: Apr. 9, 2006

(86) PCT No.: PCT/IL2006/000447
§ 371 (c)(1),
(2), (4) Date: Oct. 9, 2007

(87) PCT Pub. No.: WO2006/109298
PCT Pub. Date: Oct. 19, 2006

(65) Prior Publication Data
US 2009/0122298 A1    May 14, 2009

(30) Foreign Application Priority Data
Apr. 10, 2005  (IL) .......................................... 167932

(51) Int. Cl.
*G01P 3/36*   (2006.01)
(52) U.S. Cl. ....................................... 356/28; 356/28.5
(58) Field of Classification Search ........... 356/3.01–22, 356/28, 28.5, 3.01–3.15, 4.01–4.1, 5.01–5.15
See application file for complete search history.

(56) References Cited

U.S. PATENT DOCUMENTS

| | | | |
|---|---|---|---|
| 4,097,800 A | | 6/1978 | Kuchmas, Jr. et al. |
| 4,119,379 A | * | 10/1978 | Zindler .................... 356/5.02 |
| 4,185,192 A | | 1/1980 | Wagner |
| 4,317,992 A | | 3/1982 | Stauffer |
| 4,396,945 A | | 8/1983 | DiMatteo et al. |
| 4,590,410 A | | 5/1986 | Jönsson |
| 4,724,480 A | | 2/1988 | Hecker et al. |
| 4,855,608 A | | 8/1989 | Peterson, II |

(Continued)

FOREIGN PATENT DOCUMENTS

DE          19930096          5/2000

(Continued)

OTHER PUBLICATIONS

International Search Report for PCT Patent Application No. PCT/IL2006/000447, dated Jun. 29, 2007.

(Continued)

*Primary Examiner* — Thomas H Tarcza
*Assistant Examiner* — Luke D Ratcliffe
(74) *Attorney, Agent, or Firm* — Schnader Harrison Segal & Lewis LLP

(57) ABSTRACT

There is provided a system for forming an optical screen, including a continuous wave or pulsed laser transmitter for transmitting a beam of radiation at a predetermined wavelength and forming a planar or curved surface to be traversed by a moving object, at least one receiver including an array of detectors for receiving reflected or scattered beam radiation from the object and directing it towards the detectors for producing a signal, and a detection logic receiving the signal and determining parameters selected from the group of spatial position, velocity and direction of propulsion of them moving object. A method for detecting a moving object is also provided.

10 Claims, 5 Drawing Sheets

U.S. PATENT DOCUMENTS

| | | | |
|---|---|---|---|
| 4,864,515 A | 9/1989 | Deck et al. | |
| 4,949,972 A | 8/1990 | Goodwin et al. | |
| 5,198,661 A * | 3/1993 | Anderson et al. | 250/221 |
| 5,554,262 A | 9/1996 | Turner | |
| 5,988,645 A * | 11/1999 | Downing | 273/348 |
| 6,259,365 B1 | 7/2001 | Hagar et al. | |
| 6,943,337 B2 | 9/2005 | Frumker et al. | |
| 2003/0039036 A1* | 2/2003 | Kruschwitz et al. | 359/707 |
| 2007/0159453 A1* | 7/2007 | Inoue | 345/156 |

FOREIGN PATENT DOCUMENTS

| | | |
|---|---|---|
| JP | 6119592 | 4/1994 |
| WO | PCT/JP04/18838 | * 12/2004 |

OTHER PUBLICATIONS

International Search Report and Written Opinion for PCT/IL2006/000447 dated Jun. 29, 2007.

* cited by examiner

OPTICAL SCREEN, SYSTEMS AND METHODS FOR PRODUCING AND OPERATING SAME

FIELD OF THE INVENTION

The present invention relates to optical screen systems and methods for forming optical screens and for detecting and identifying objects traversing the screens. In addition, the present invention is concerned with systems and methods for detecting the position of an object passing through the optical screen.

BACKGROUND OF THE INVENTION

The exact positioning, time and velocity of an object, such as a projectile, relative to, or passing through, a real surface or an imaginary surface, such as an active optical screen, is important for determining the timing and flight trajectory of the object. Such screens have applications in the study of the dynamics of projectiles and in the protection of stationary or moving targets against projectiles sent toward the targets.

Some of the common methods for determining position, time and velocity are as follows:
 i) fast photography of the projectile, using two consequent exposures at a known time delay, and
 ii) consumable screens which are torn by the projectile, namely, an electrical or optical conductor screen or screens placed in the trajectory of the projectile.

The first of the above methods requires a bully and expensive fast camera, whereas the second method is low priced, but requires replacement after every event and cannot perform as a permanent, multi-shot, measurement set up. The need for a re-usable, multi-shot, small and simple system calls for a novel system and method.

Optical or laser screens were proposed in the past. Generally, such systems fall into two categories of systems: a) active systems based on signal transmission towards an object and detection of signals reflected or scattered from the object, and b) passive systems that do not utilize energy transmission towards a target to be detected. A screen for traffic warning, according to their colour, is described in Japanese Patent Application No. 6,119,592. Similar kinds of screens proposed for use by pilots, such as landing strip guides, are described in DE Patent 19930096. U.S. Pat. No. 5,554,262 describes a system using a permanent screen, having a laser transmitter on one side and a laser receiver on the other, for maintaining the right position of paper edge in papermaking machines. The use of optical screens made of optical lines running back and forth between two mirrors is described in U.S. Pat. Nos. 4,097,800 and 6,259,365, where any interruption of the screen results in the same signal, providing no geometrical resolution. Temporally scanning the beam between various fixed mirrors, to enable some dimensional resolution is described in U.S. Pat. No. 4,855,608, wherein a polygon scanning device is operated, enabling the scan of very slow moving objects, depending on the scanning velocity. U.S. Pat. No. 4,185,192 discloses a passive optical system utilizing two detectors oriented in such a way that their optical axes and cone shaped fields-of-view intersect, thereby creating an overlapping region between these fields-of-view. By affecting this, only those signals from the detectors, which are received simultaneously, are thereby indicative of the fact the detected light comes from the overlapping volume. Another example of a passive optical system for determining the presence of an object by utilizing the forming of a scene at the intersection of two optical paths associated with two detectors, is disclosed in U.S. Pat. No. 4,317,992. U.S. Pat. No. 4,396,945 discloses a technique that can be utilized in either an active or passive system for determining the position of an object in space. This technique is based on the determination of the intersection of a line with a plane or with another line. U.S. Pat. No. 4,590,410 discloses a system, which is aimed at detecting small objects. In this case, multiple light emitters and multiple light detectors are utilized. According to the technique described in U.S. Pat. Nos. 4,724,480, a system is composed of at least one projector generating a non-planar light and at least one camera, oriented such that the optical axes of the camera and projector intersect. In this way, the projector associated with a first object and the region of intersection associated with a second object, can be aligned. U.S. Pat. No. 6,943,337 discloses a system, where a laser forms a screen like plane, and camera-like detectors projecting substantially perpendicular to the plane of the screen, are faced at a selected area of the screen, to detect scattered light from an object passing through the screen. This geometry provides no information on the object velocity or orientation. None of the above systems enable the detection of the required parameters for detecting fast moving objects such as projectiles.

An optical screen for detection of position, time of passage and velocity of an object, e.g., a projectile, through the optical or light screen, has to have the following properties:
 a) a capability of two and/or three-dimensional positioning;
 b) a velocity determining capability to distinguish between slow and fast moving objections;
 c) a multi-directional capability, or ability to measure the penetration angle;
 d) not to be affected by sunlight or stray light, and lighted or shaded areas, and
 e) able to detect objects above specified sized in diameter and/or length.

DISCLOSURE OF THE INVENTION

It is therefore a broad object of the present invention to provide a system and method for forming an optical screen and receiver for collecting and determining data concerning the presence of a moving object, or time of passage, or angle of crossing the screen, or velocity of moving objects, such as projectiles, through the optical or light screen.

It is a further object of the present invention to provide an optical screen and detector system, capable of operating outdoors while compensating for sunlight and reflected sunlight acting as a disturbing radiation source, having radiation or signal values similar to, or even larger than, the operating optical radiation or signals.

In accordance with the present invention there is therefore provided a system for forming an optical screen, comprising at least one continuous wave or pulsed laser transmitter for transmitting a beam of radiation at a predetermined wavelength and forming at least one planar or curved surface to be traversed by a moving object; at least one receiver including an array of detectors for receiving reflected or scattered beam radiation from said object and directing it towards at least one of said detectors for producing a signal, and a detection logic means receiving said signal and determining parameters selected from the group of spatial position, velocity and direction of propulsion of said moving object.

The invention further provides a method for detecting a moving object, comprising providing a system for forming an optical screen, comprising at least one continuous wave or pulsed laser transmitter for transmitting a beam of radiation at a predetermined wavelength and forming at least one planar or curved surface to be traversed by a moving object; at least one receiver including an array of detectors for receiving reflected or scattered beam radiation from said object and directing it towards at least one of said detectors for producing a signal, and a detection logic means receiving said signal and determining parameters selected from the group of spatial position, velocity and direction of propulsion of said moving object; transmitting at least one beam of radiation towards the estimated direction of movement of the object, to form a screen to be traversed by said object; detecting reflected/scattered radiation from said object and producing a signal of the detected radiation; feeding the signal to said logic means, and determining data relating to said object based on the detected signal.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic illustration of a laser transmitter, according to the invention;

FIGS. 2A to 2E are schematic illustrations of various laser transmitters, according to the present invention;

FIG. 3 is a schematic illustration of a receiver, according to the present invention;

FIG. 4 is a schematic illustration of an optical screen system, according to the present invention;

FIG. 5 is a schematic illustration of a preferred embodiment of a system including one transmitter and two receivers;

FIGS. 6A and 6B are schematic views of a transmitter and a receiver having a common fan-out point;

FIGS. 7A and 7B are schematic views of the system according to the present invention, providing velocity detection capability, utilizing a single screen;

FIG. 8 is an experimental diagram of times of penetration of a projectile through an optical screen, according to the present invention, and FIGS. 9A and 9B are schematic views of a further embodiment according to the present invention;

FIGS. 10A to 10C are schematic illustrations of one or more systems according the present invention, mounted in a cylindrical body.

DETAILED DESCRIPTION OF THE PREFERRED EMBODIMENTS

Figure 1:
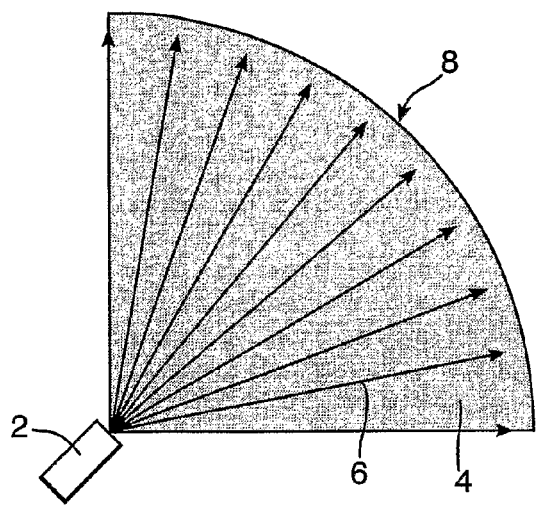

FIG. 1 schematically illustrates a laser transmitter 2, spreading a laser beam into a contiguous surface 4 or periodically intermitted beams 6, forming a screen 8. The laser transmitter 2 uses an optical light spreading device, such as spherical and/or cylindrical and/or diffractive lenses, for transmitting a beam of radiation at a predetermined wavelength, to a predetermined location and direction, towards e.g., a passing projectile. The surface of the screen can be planar or curved in any other configuration. Examples of the various ways to spread or fan-out the laser beam for forming screens of various configurations sizes and colours, are shown in FIGS. 2A to 2E.

Figure 2A:
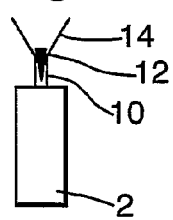
Figure 2B:
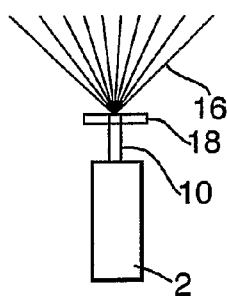
Figure 2C:
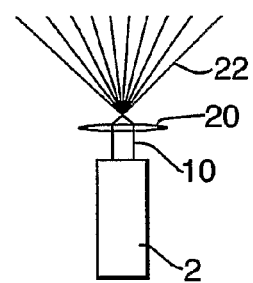
Figure 2D:
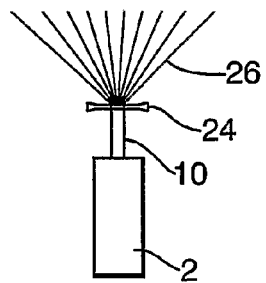
Figure 2E:
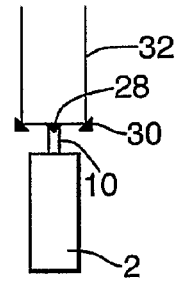

FIG. 2A is an example of a conical screen, e.g., required for protection of objects around their whole circumference, having a laser 2 emitting a CW or pulsed beam 10 that impinges on a conical mirror 12, and spreads into a three-dimensional conical screen 14. FIG. 2B is a two or three-dimensional screen, composed of discrete beams 16 formed by a laser 2 emitting a beam 10 and passing through a diffractive grating or other diffractive optics 18 spreading the single beam 10 into a plurality of beams 16. FIG. 2C is a spatially, continuous screen 8 formed by a laser 2 emitting a beam 10 passing through a converging spherical or cylindrical lens 20, spreading the light into plane screen 22. FIG. 2D is a spatially continuous screen formed by a laser 2 emitting beam 10 passing through a diverging spherical or cylindrical lens 24, spreading the light into plane screen 26. FIG. 2E depicts a cylindrical screen, formed by a laser 2 emitting beam 10 passing through an inner conical reflector 28 and an outer conical reflector 30, spreading the light into a cylindrical or conical screen 32. The colour of the screen can also be determined by selecting the wavelength of the laser's beam.

Figure 3:
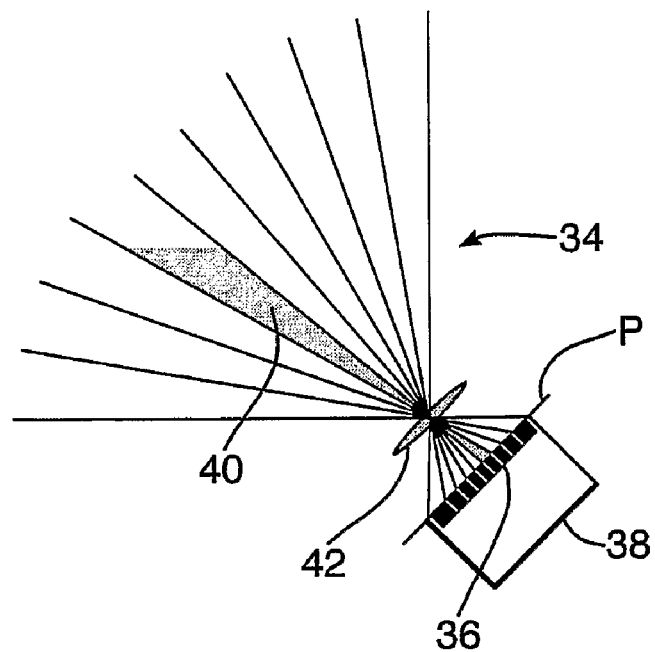

Referring to FIG. 3, there is shown a schematic view of a receiver 34, which includes an array of detectors 36 located at an image plane P, and a detection logic means 38. Each detector 36 accepting radiation, e.g., in the form of a solid cone 40 via a converging optics, e.g., a lens 42. The signal outputs for the array of detectors 36 are electrically transmitted to the detection logic means 38 to be further processed, as will be discussed hereinafter. The lens 42 can be suitably coated to form a filter, or preceded or followed by a colour filter (not shown), to reduce noise and receive selective laser colour. The various kinds of optics used for the transmitters 2 shown in FIGS. 2A to 2E can serve as the detector's optics as well.

Figure 4:
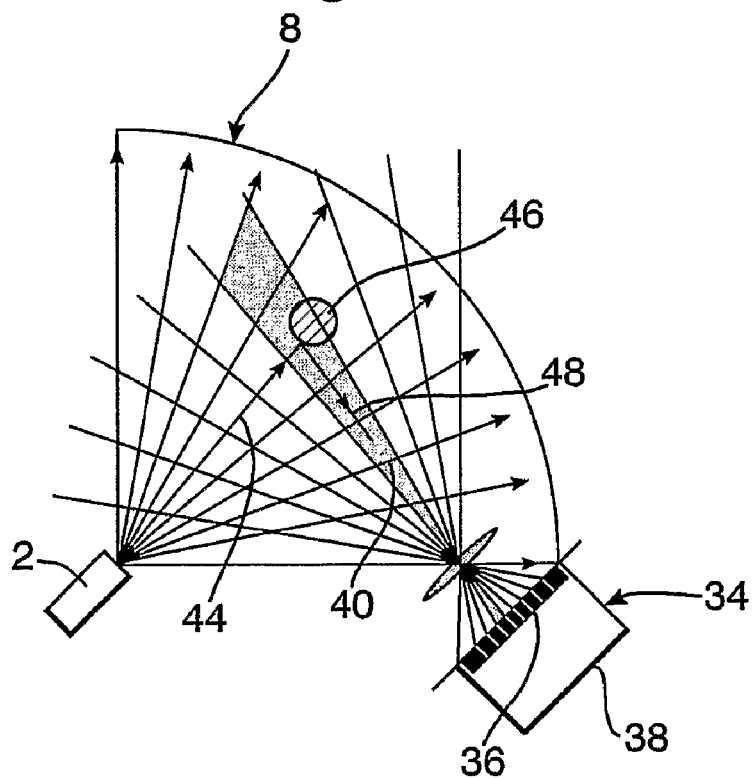

FIG. 4 is a schematic view of a system consisting of a laser transmitter 2 and receiver 34, showing a laser ray 44 impinging on a cylindrical object 46 penetrating the optical screen 8 and reflecting and/or scattering light 48 into the array of detectors 36. The position of the object 46 is detected by a single detector on the array, covering the dotted solid cone 40.

Figure 5:
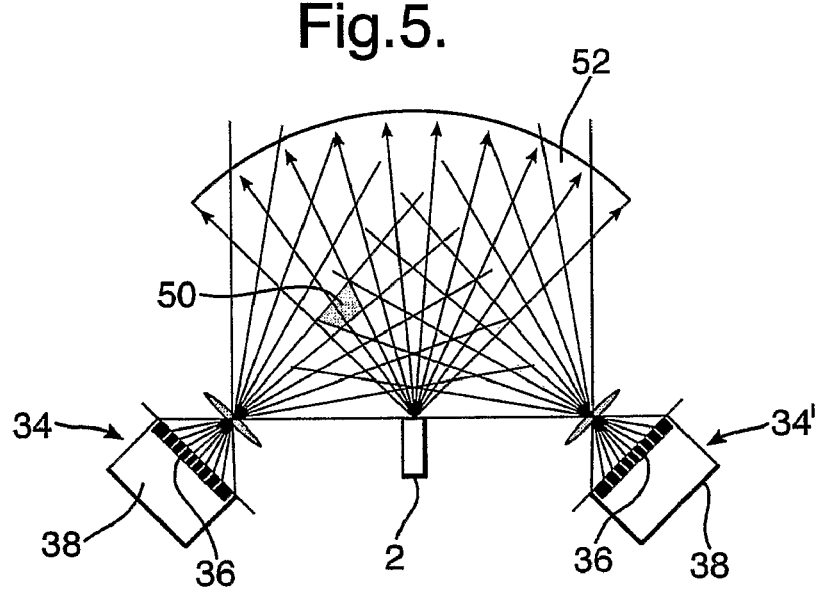

FIG. 5 schematically illustrates an embodiment utilizing a single transmitter 2 and two receivers 34, 34'. Here, when the laser beam impinges on an object in the area 50, signals from reflected/scattered light will appear in one detector 36 on the right receiver 34' and on detector 36 on the left receiver 34, defining the position of the object in the screen plane 52.

Figure 6A:
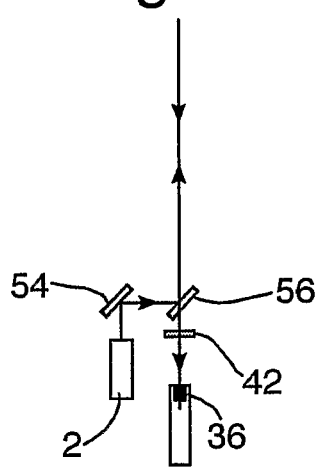
Figure 6B:
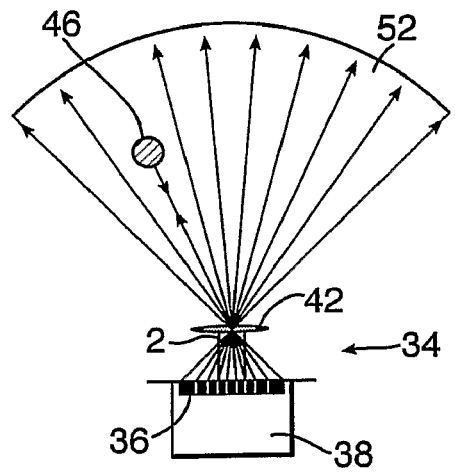

FIGS. 6A and 6B show the schematic views of a receiver 34 and a transmitter 2 having a common fan-out point, and capable of locating the azimuthal position, determined by a lighted single detector. The radial distance to the object 46 can be estimated by the amplitude of the reflected signal, if the size and reflectivity of the penetrating object is known. As seen in FIG. 6A, the transmitted beam 34 passes through a mirror 54 and a beam splitter 56, and the reflected beam passes through the beam splitter 56 and lens 42, to be received by a receiver 34 and a detector 36.

Figure 7A:
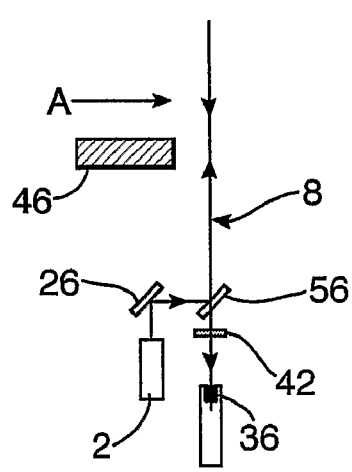
Figure 7B:
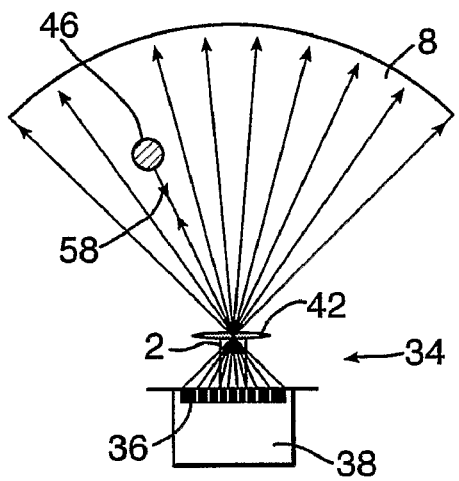

A modification of the embodiment of FIGS. 6A and 6B is shown in FIGS. 7A and 7B, providing velocity detection capability of a moving object, utilizing a single detection logic, where the signal 58, reflected/scattered from the object 46, moving in the direction of arrow A, is measured temporally. When the length of the object 46 is known or estimated, the velocity of the moving object is the length thereof divided by the time elapsed from the penetration to, and exit of the object 46 from, the screen 8. With such a system, it is possible to calculate various parameters and obtain on-time data concerning a moving object. For example, for velocity detection of a moving object, by using a single optical screen, the velocity is calculated by the detected time lag between the input signal at the start of the penetration of the object, and the last signal at its exit time from the screen. Knowing or estimating the projectile length, the velocity equals the length of object/time lag between the two signals.

Figure 8:
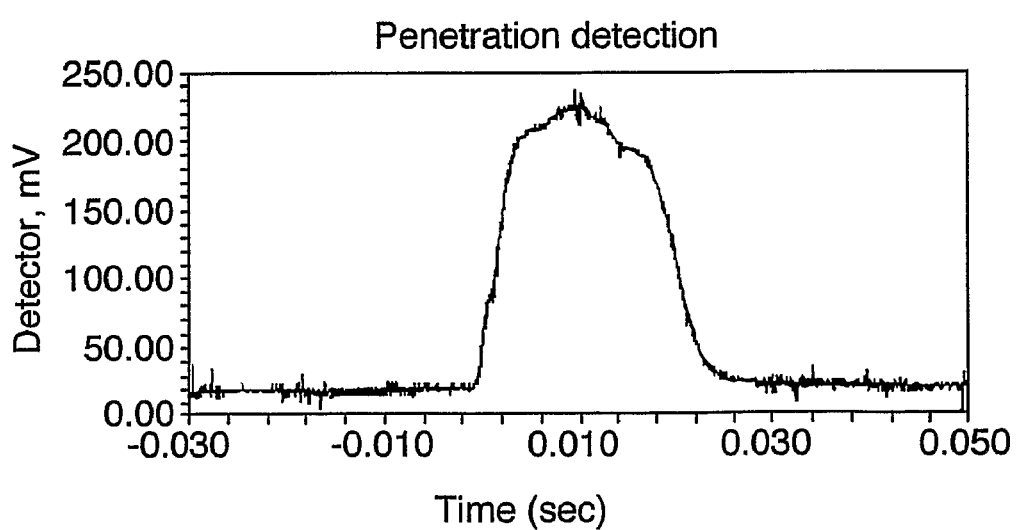

The actual measurement of this process is illustrated in FIG. 8. Similar single or multi-array systems, having many fan-out points, can perform in the same way. Seen is an experimental result of penetration time signals of a cylindrical object having a length of 20 cm, into an optical planar screen, according to the present invention. The time lag from the beginning to the end of penetration is about 2 ms, counting from zero to 2 ms. The laser is a 808 nm wavelength, 250 mW power, CW diode unit, followed by a cylindrical lens, $\phi=7$ mm, f=10 mm, made of BK-7 glass, and the detector is a large radiant area, high speed, high sensitivity Silicon PIN photodiode, preceded by a plano-convex, $\phi=25$ mm, f=25 mm, AR coated lens. The geometry of the system is like the one described with reference to FIG. 3. It is clearly seen that the velocity of the projectile is:

$$\text{velocity}=\text{length of projectile/time lag}=20 \text{ cm}/2 \text{ ms}=100 \text{ m/s}.$$

Figure 9A:
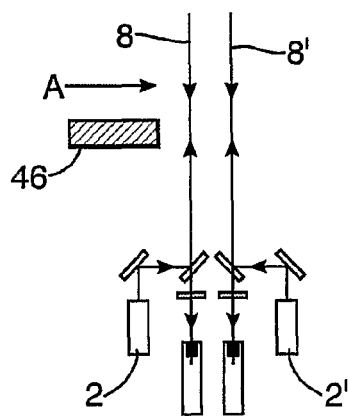
Figure 9B:
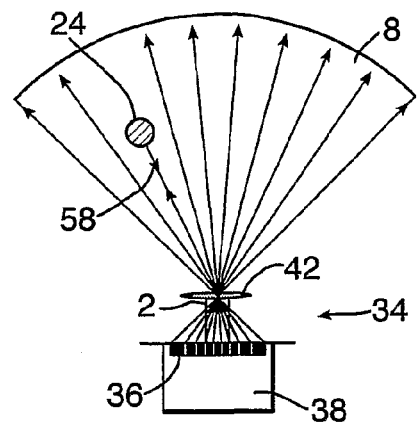

FIGS. 9A and 9B are schematic views of the two systems of FIGS. 7A and 7B, according to the present invention, providing velocity detection capability utilizing a detection logic, where the signal 58, reflected/scattered from an object 46 moving in a direction of arrow A, is measured temporally, once traversing a first screen 8 and then traversing a second screen 8'. The distance between the screens 8, 8' is known, and the velocity of the object 46 is therefore its length divided by the time elapsed from the penetration of the object 46 through the first screen to the second screen. The spatial disposition of the object on the first screen 8 and the spatial disposition of the object of the second screen 8', provides information with regard to the angular or trajectory direction.

When two spaced-apart screens are formed, it is possible to calculate the velocity of the moving object, using the time lag between the signals obtained by the object traversing each screen and knowing the distance between the two screens.

For three-dimensional detection of a moving body, there are formed at least two screens and the inclination of the object is determined by the relative position that the object traverses each screen and by knowing the distance between the screens.

Figure 10A:
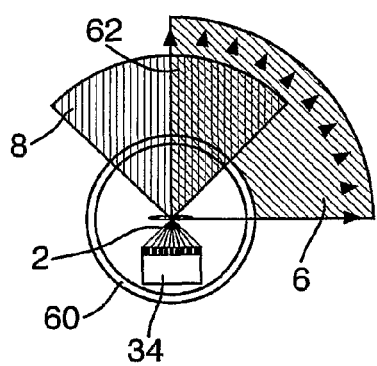
Figure 10B:
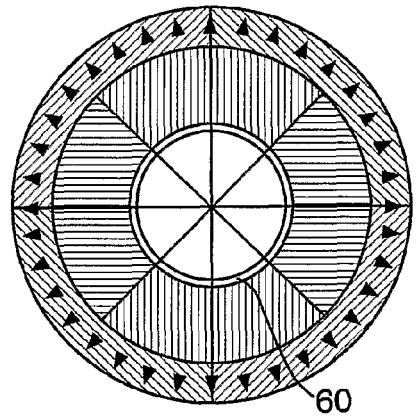
Figure 10C:
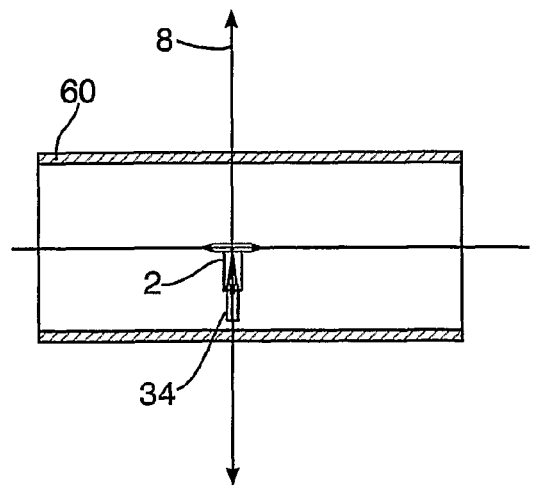

Referring to FIGS. 10A to 10C there is seen a transmitter 2 and a receiver 34 mounted in a non-shielding, transparent, cylindrical body 60. The beam transmitted by a single transmitter 2 forms a screen 8, extending perpendicular to the axis of the cylinder and having a coverage angle, as shown in this Figure. A plurality of transmitters 2 and receivers 34 (not shown) can cover the entire circumference of the cylindrical body 60, namely, covering a 360° angle, as shown in FIG. 10B. This can be effected by using e.g., four or six, or any number of transmitters and receivers mounted in cylinder 60. The double-hatched area 62 shown in FIG. 10A, corresponds to the area covered by a single transmitter and receiver.

The method according to the present invention also facilitates mounting at least one optical screen-producing system in a cylindrical body 60, or similar non-shielding, transparent body, and launching it towards a moving object. When the body is in proximity to the object, there is formed at least one screen in the direction of movement of the object and the reflected or scattered radiation is detected by the receiver as described hereinbefore, for determining data concerning the moving object.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for detecting a moving object, comprising:
    at least one continuous wave or pulsed laser transmitter comprising beam shaping optics operable for transmitting a beam of radiation at a predetermined wavelength and forming at least one planar or curved surface in a desired shape and size constituting an optical screen to be traversed by a moving object said moving object being a projectile;
    at least one receiver including an array of detectors for receiving reflected or scattered beam radiation of said optical screen, from said projectile and directing it towards at least one of said detectors for producing a signal;
    said transmitter and receiver are located on one side of said screen, and
    a detection logic means receiving said signal and determining parameters selected from the group of spatial position, velocity and direction of propulsion of said projectile.

2. The system as claimed in claim 1, wherein said transmitter further comprises means for selecting the wavelength of the laser for producing screens of various colors.

3. The system as claimed in claim 1, wherein said receiver comprises reflected or scattered beam radiation converging optics.

4. The system as claimed in claim 3, wherein said converging optics further includes a spectral filter for filtering out radiation noise from the reflected beam.

5. The system as claimed in claim 1, including two transmitters for forming two spaced-apart screens enabling velocity and trajectory determination of said projectile, thereby enabling to distinguish between slow and fast moving objects.

6. The system as claimed in claim 1, wherein said transmitter and said receiver are mounted in cylindrical body, producing a screen perpendicular to the axis of said body.

7. A method for detecting a moving object, comprising:
    providing a system for detecting a moving object, comprising at least one continuous wave or pulsed laser transmitter comprising beam shaping optics operable for transmitting a beam of radiation at a predetermined wavelength and forming at least one planar or curved surface in a desired shape and size constituting an optical screen to be traversed by a moving object, said moving object being a projectile; at least one receiver including an array of detectors for receiving reflected or scattered beam radiation of said optical screen from said projectile and directing towards at least one of said detectors for producing a signal, said transmitter and receiver are located on one side of said screen, and a detection logic means receiving said signal and determining parameters selected from the group of spatial position, velocity and direction of propulsion of said projectile;

transmitting at least one beam of radiation towards the estimated direction of movement of the projectile, to form a screen to be traversed by said projectile;

detecting reflected/scattered radiation from said projectile and producing a signal of the detected radiation;

feeding the signal to said logic means; and determining data relating to said projectile based on the detected signal.

8. The method as claimed in claim 7, wherein said data relating to the detected projectile includes its position in space and its velocity.

9. The method as claimed in claim 7, further comprising forming at least two screens, spaced-apart at a known distance and determining the velocity of said projectile by calculating the time lag between signals received from each of said two screens.

10. The method as claimed in claim 7, comprising forming at least two screens, and determining the inclination of the moving object by calculating the relative position the projectile traversed each screen and the distance between the screens.

* * * * *